United States Patent [19]

Su

[11] Patent Number: 5,552,577
[45] Date of Patent: Sep. 3, 1996

[54] MULTI-PURPOSE COOKER FOR STEAMING, DRYING OR BOILING FOODSTUFFS

[76] Inventor: Yung-Sen Su, P.O. Box 82-144, Taipei, Taiwan

[21] Appl. No.: 83,368

[22] Filed: Jun. 25, 1993

[51] Int. Cl.⁶ .............................. H05B 3/00; A47J 27/00
[52] U.S. Cl. ...................... 219/401; 219/438; 219/472; 99/339; 99/340; 99/357; 99/467
[58] Field of Search ........................ 219/400, 401, 219/391, 405, 411, 472, 438, 392, 393, 399; 99/339, 340, 357, 483, 467, 451

[56] References Cited

U.S. PATENT DOCUMENTS

| 1,998,920 | 4/1935 | Bremer | 99/339 |
|---|---|---|---|
| 2,466,349 | 4/1949 | Andersen | 99/340 |
| 3,577,908 | 5/1971 | Burg | 99/340 |
| 4,889,972 | 12/1989 | Chang | 99/339 |
| 5,176,067 | 1/1993 | Higgins | 99/340 |

FOREIGN PATENT DOCUMENTS

| 497867 | 12/1938 | United Kingdom | 99/340 |
|---|---|---|---|

*Primary Examiner*—Bruce A. Reynolds
*Assistant Examiner*—John A. Jeffery
*Attorney, Agent, or Firm*—Alfred Lei

[57] ABSTRACT

A multi-purpose cooker for steaming, drying or boiling foodstuffs includes a base having a switch, an electric heater mounted on the base, a bottom plate mounted on the electric heater, a water container mounted on the bottom plate, a water collector mounted on the water container, a plurality of drying pans mounted on the water container, a steaming pan mounted on the drying pans, a cooking pan mounted on the steaming pan, a cover mounted on the cooking pan and formed on a top with a recess having a center hole, and a plurality of ventilating perforations, and a lid formed with a recess at a center and a plurality of slots thereon.

2 Claims, 13 Drawing Sheets

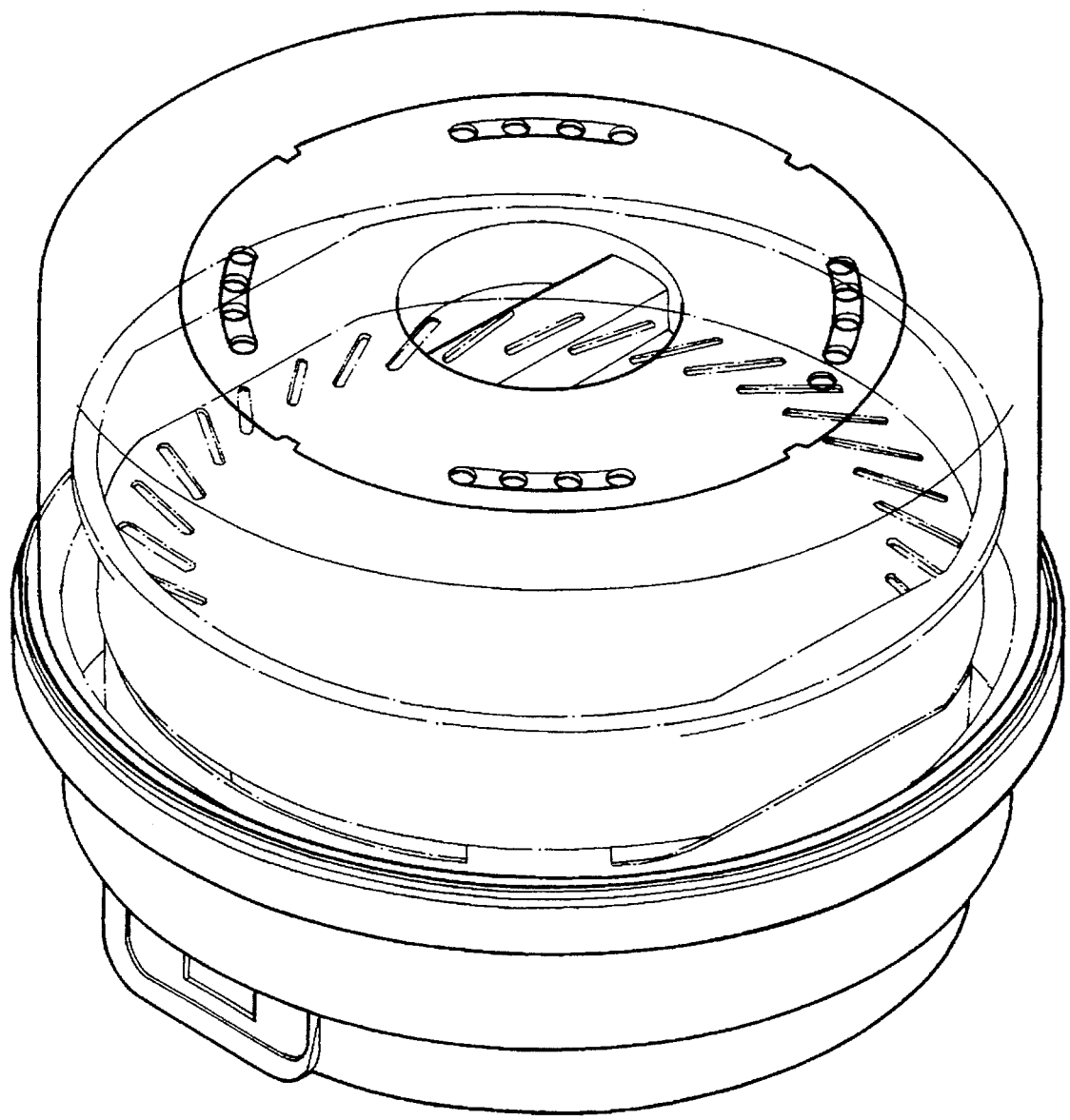
F I G. 10

MULTI-PURPOSE COOKER FOR STEAMING, DRYING OR BOILING FOODSTUFFS

BACKGROUND OF THE INVENTION

It has been found that the electric cooker sold in the marketplace has only one purpose. As such, it is necessary for an user to prepare a cooking pan, a drying pan, a steaming pan as well as an egg boiling pan thereby wasting a lot of money and furthermore, causing much inconvenience in use.

Therefore, it is an object of the present invention to provide a multi-purpose cooker which may obviate and mitigate the above-mentioned drawbacks.

SUMMARY OF THE INVENTION

This invention relates to a multi-purpose cooker.

It is the primary object of the present invention to provide a multi-purpose cooker which may be used to cook food.

It is another object of the present invention to provide a multi-purpose cooker which may be used to dry food.

It is still another object of the present invention to provide a multi-purpose cooker which may be used to steam food.

It is still another object of the present invention to provide a multi-purpose cooker which may be used to boil eggs.

It is a further object of the present invention to provide a multi-purpose cooker which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 10 is a perspective view of the steaming pan;

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
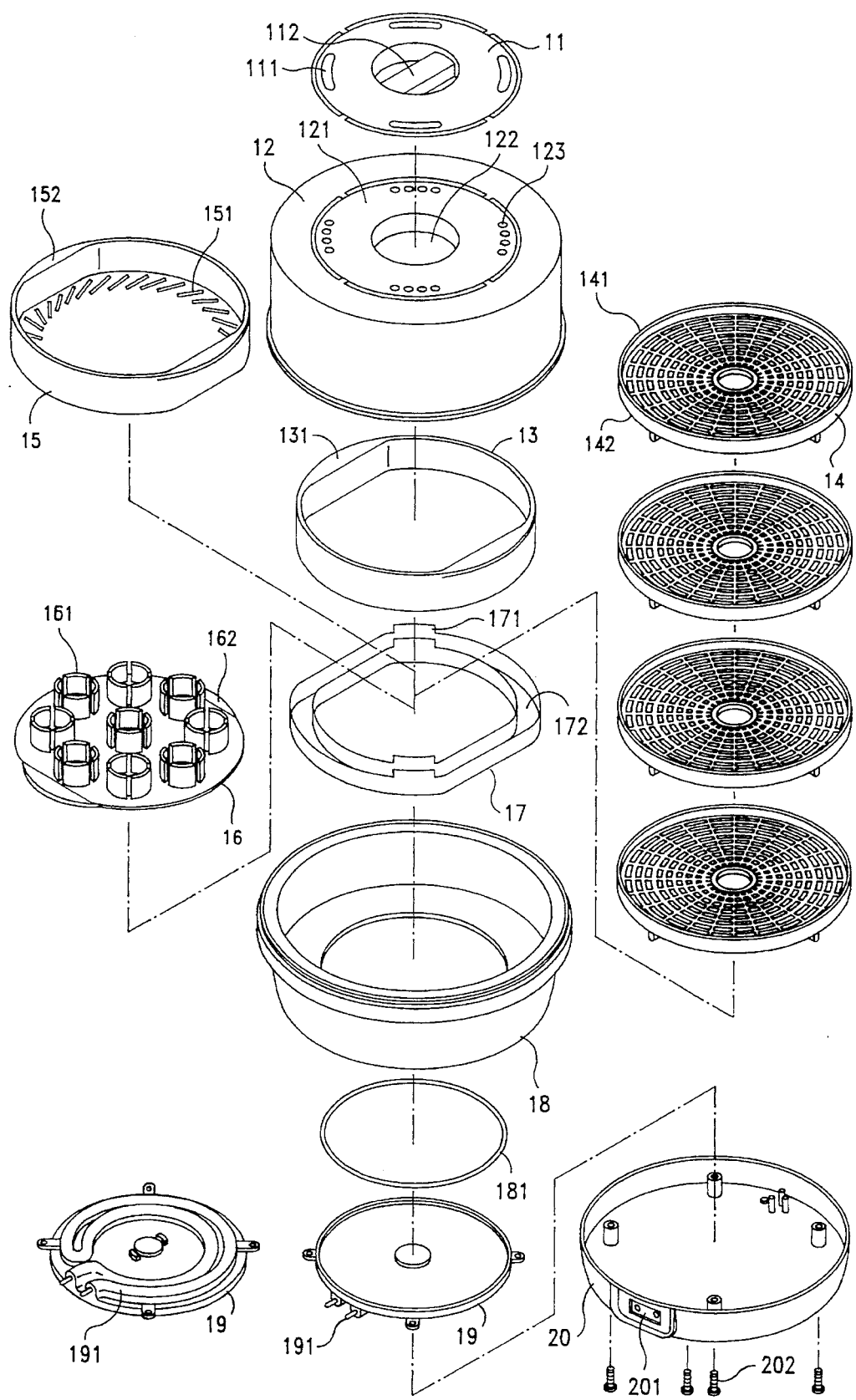
FIG. 1 is an exploded view of the present invention.

With reference to the drawings and in particular to FIG. 1 thereof, the multi-purpose cooker according to the present invention comprises a body portion composed of a lid 11, a cover 12, a cooking pan 13, drying pans 14, a steaming pan 15, an egg boiler 16, a water collector 17, a water container 18, an electric heater 19, and a base 20.

As illustrated, the cover 12 is formed on the top with a recess 121 having a center hole 122. Further, the recess 121 has a plurality of ventilating perforations 123 which are divided into four groups in this preferred embodiment. The lid 11 is formed with four slots 111 each adapted to a group of ventilating perforations 123 of the cover 12, and a recess adapted to be received in the center hole 122 of the cover 12. Further, the center of the recess of the lid 11 has a handle 112 so that the lid 11 may be rotated to adjust the number of ventilating perforations 123 of the cover 12 in alignment with the slots 111 of the lid 11 thereby controlling the flow rate of vapor therethrough.

The cooking pan 13 is provided with a lug 131 at both sides for holding in the hand.

The drying pan 14 is formed with a plurality of mesh holes 141 and a plurality of legs 142 on its bottom.

The steaming pan 15 is provided with a plurality of inclined slots 151 and a lug 152 at both sides for holding.

The egg rack 16 is provided with a plurality of circular members 162 for receiving eggs and a lug 162 at both sides for holding.

The lower portion of the present invention comprises the water collector 17, the water container 18, the electric heater 19, and the base 20. The water collector 17 is provided with an annular groove 172 and protuberances 171 on the top.

The water container 18 is disposed under the water collector 17 and has a bottom plate 181.

The electric heater 19 is mounted under the water container 18 and above the base 20. Under the electric heater 19 there is a heating tube 191 which is threadedly engaged with base 20. The base 20 is provided with a switch 201 on its side.

Figure 2:
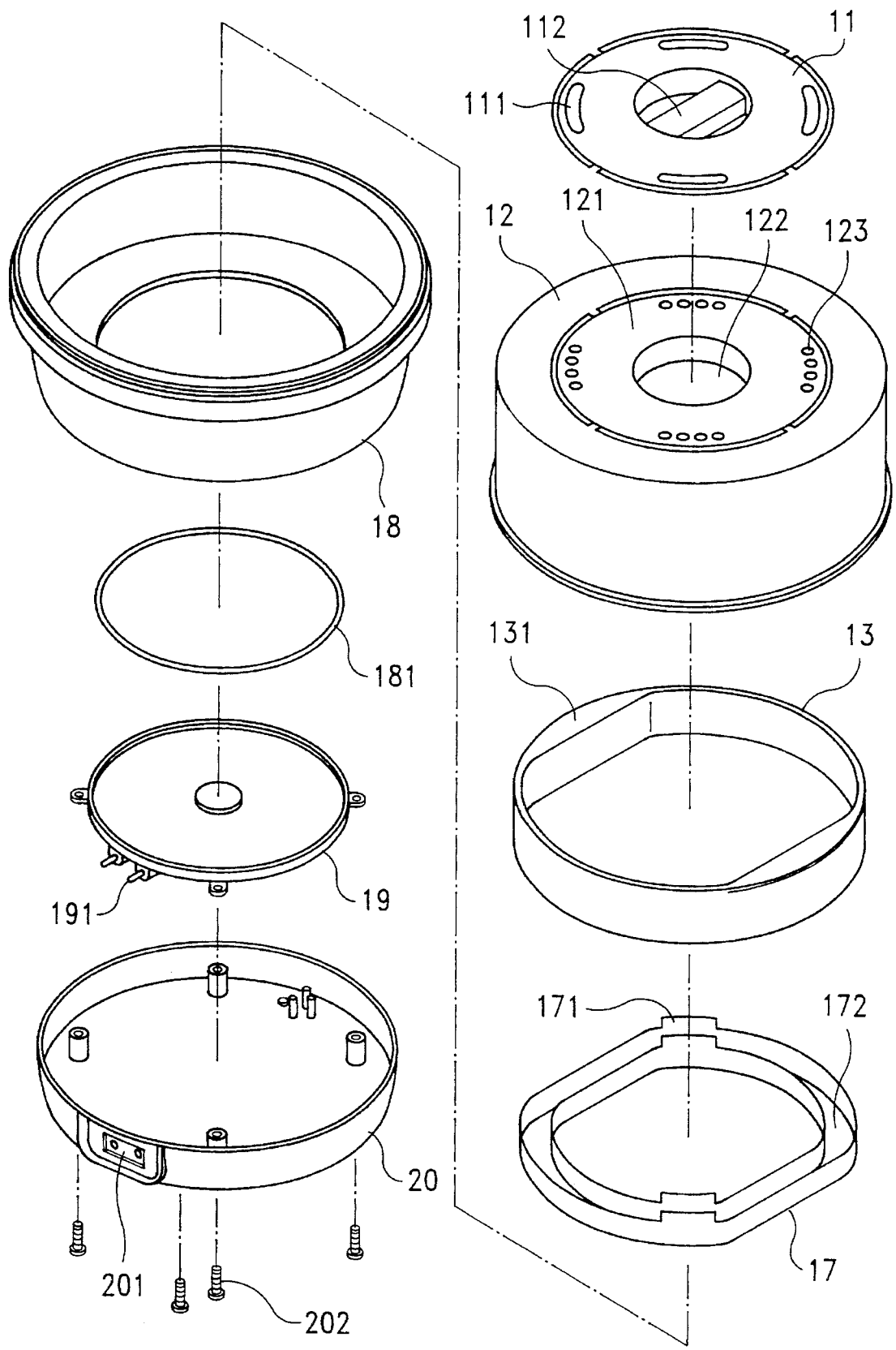
FIG. 2 is an exploded view of a cooking pan according to the present invention.
Figure 3:
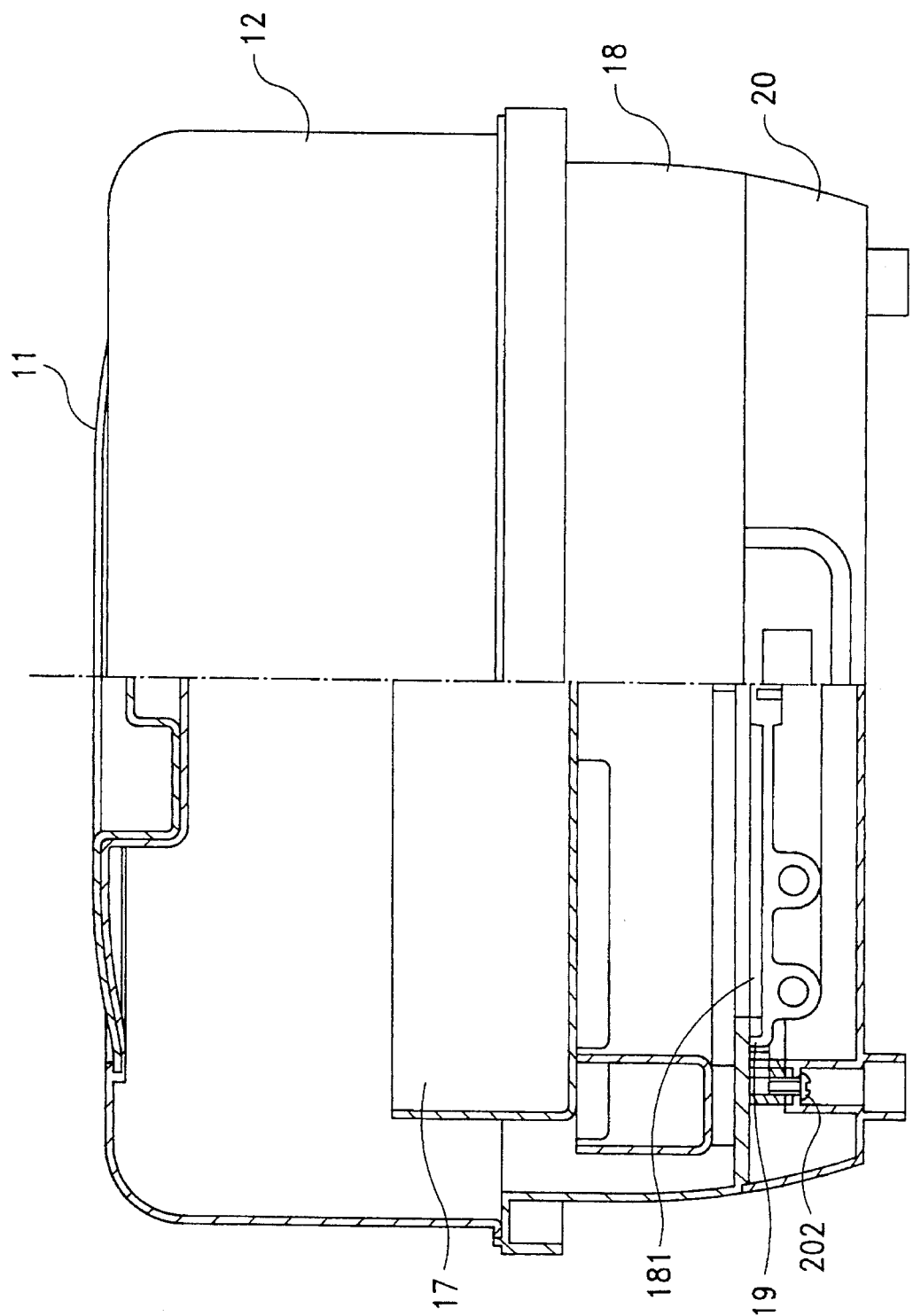
FIG. 3 is a sectional view of the cooking pan.
Figure 4:
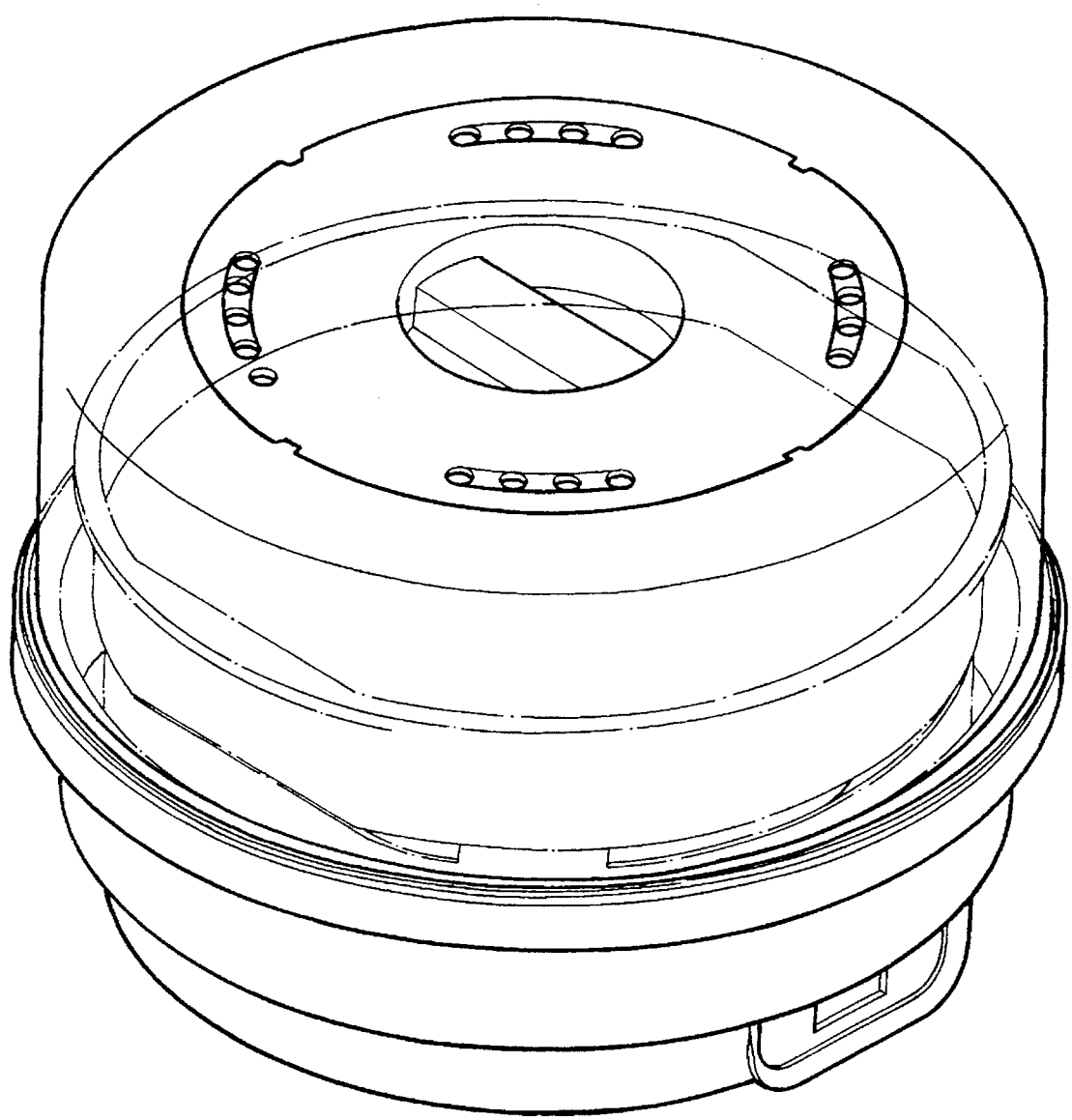
FIG. 4 is a perspective view of the cooking pan.

FIGS. 2, 3 and 4 show the way how to use the present invention to cooking food. As illustrated, the drying pans 14, the steaming pan 15, and the egg rack 16 are removed from the multi-purpose cooker.

Figure 5:
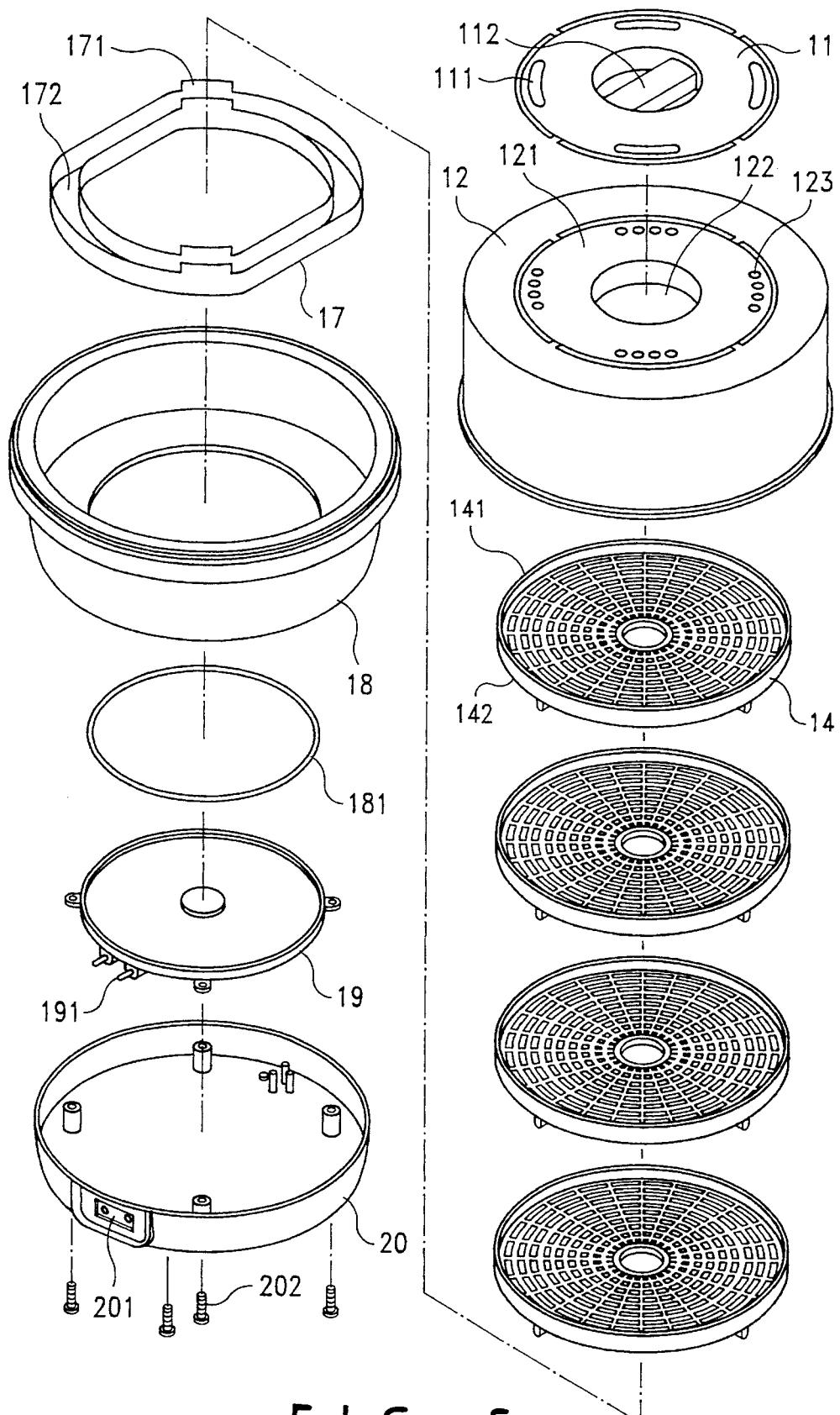
FIG. 5 is an exploded view of a drying pan according to the present invention.
Figure 6:
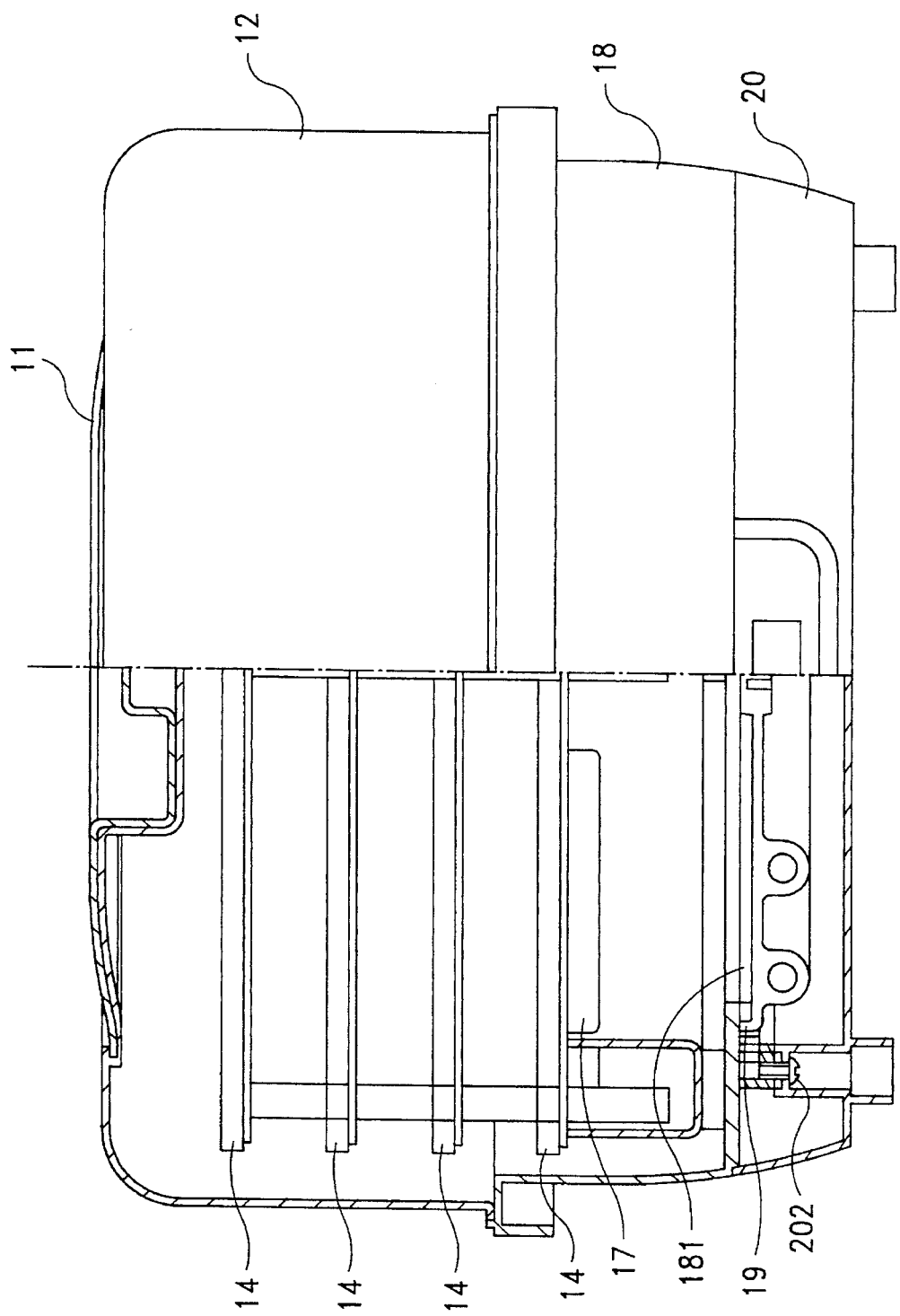
FIG. 6 is a sectional view of the drying pan.
Figure 7:
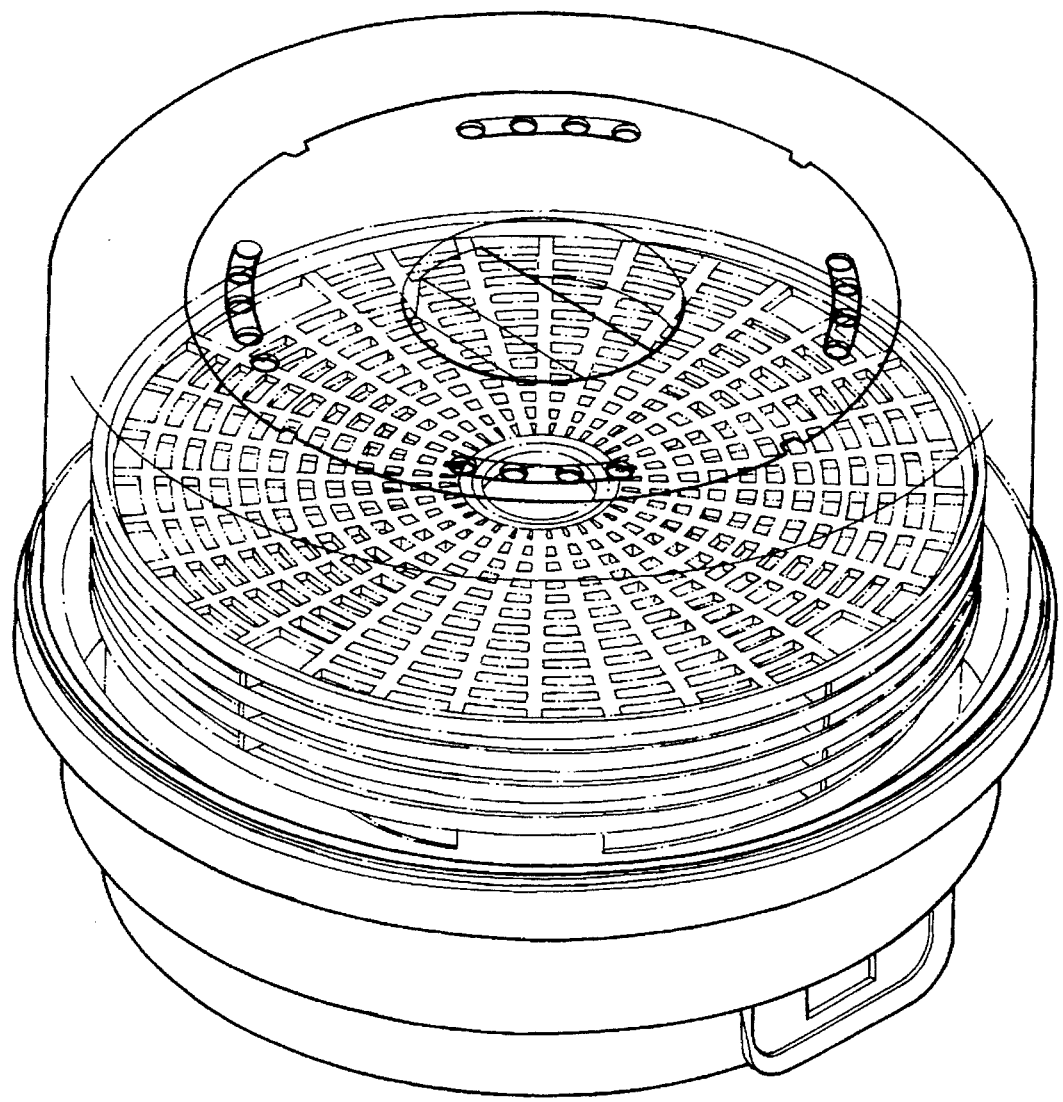
FIG. 7 is a perspective view of the drying pan.

FIGS. 5, 6 and 7 show the way how to use the present invention to dry food. As may be seen, the cooking pan 13, the steaming pan 15, and the egg rack 16 are removed from the multi-purpose cooker.

Figure 8:
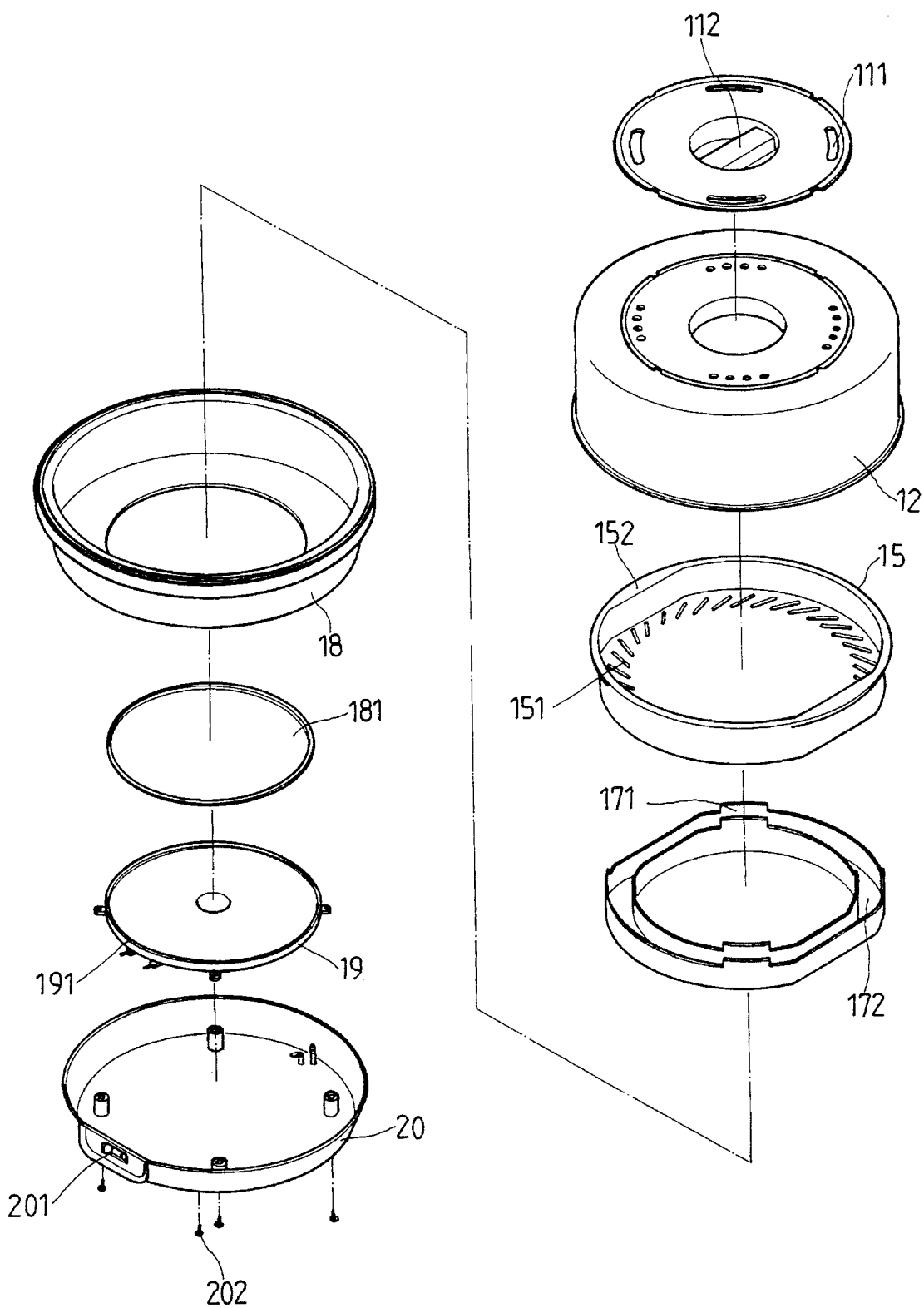
FIG. 8 is a sectional view of a steaming pan according to the present invention.
Figure 9:
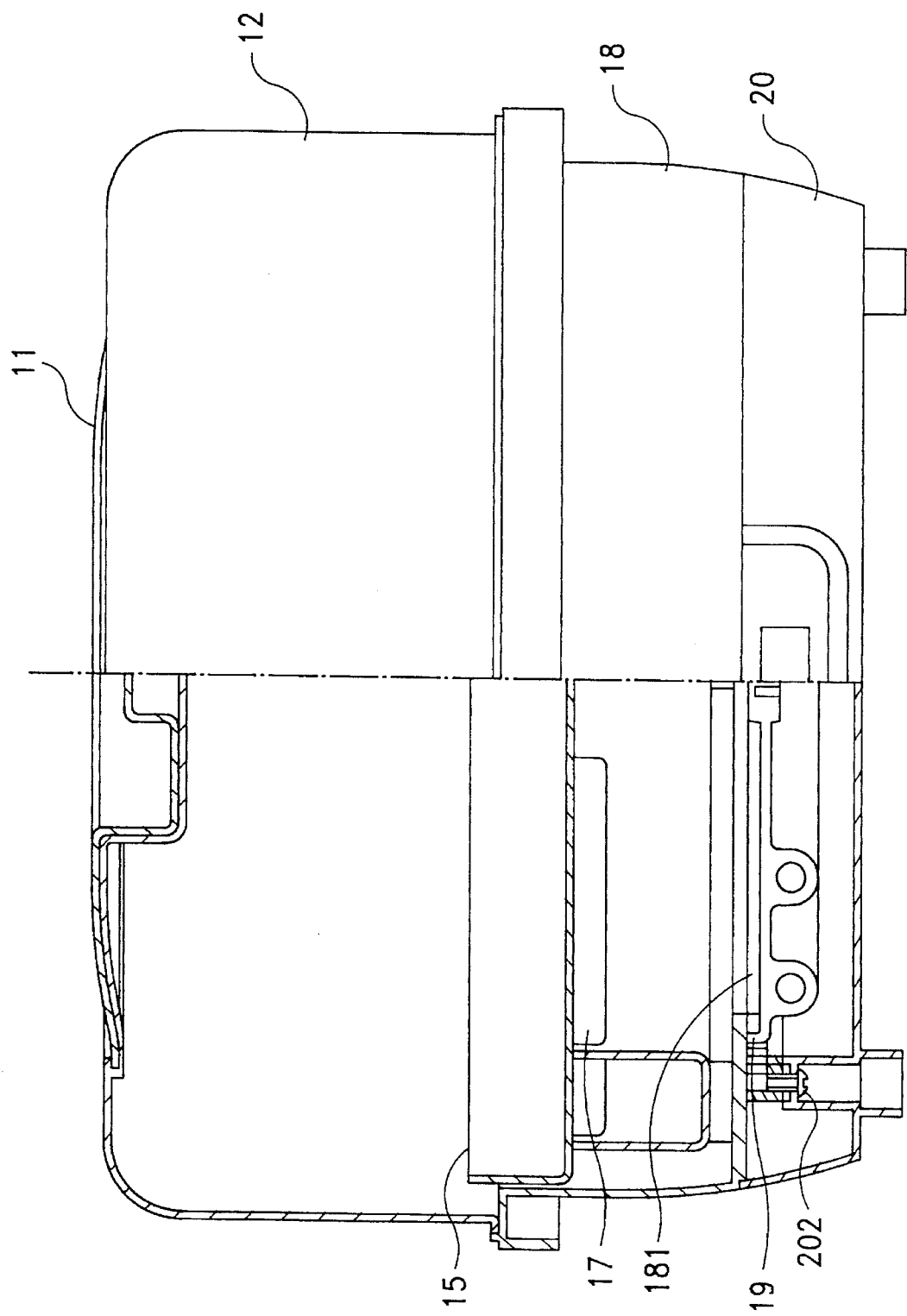
FIG. 9 is a sectional view of the steaming pan according to the present invention.

FIGS. 8, 9 and 10 show the way how to use the present invention to steam food. As shown, the cooking pan 13, the drying pans 14, and the egg rack 16 are removed from the multi-purpose cooker.

Figure 11:
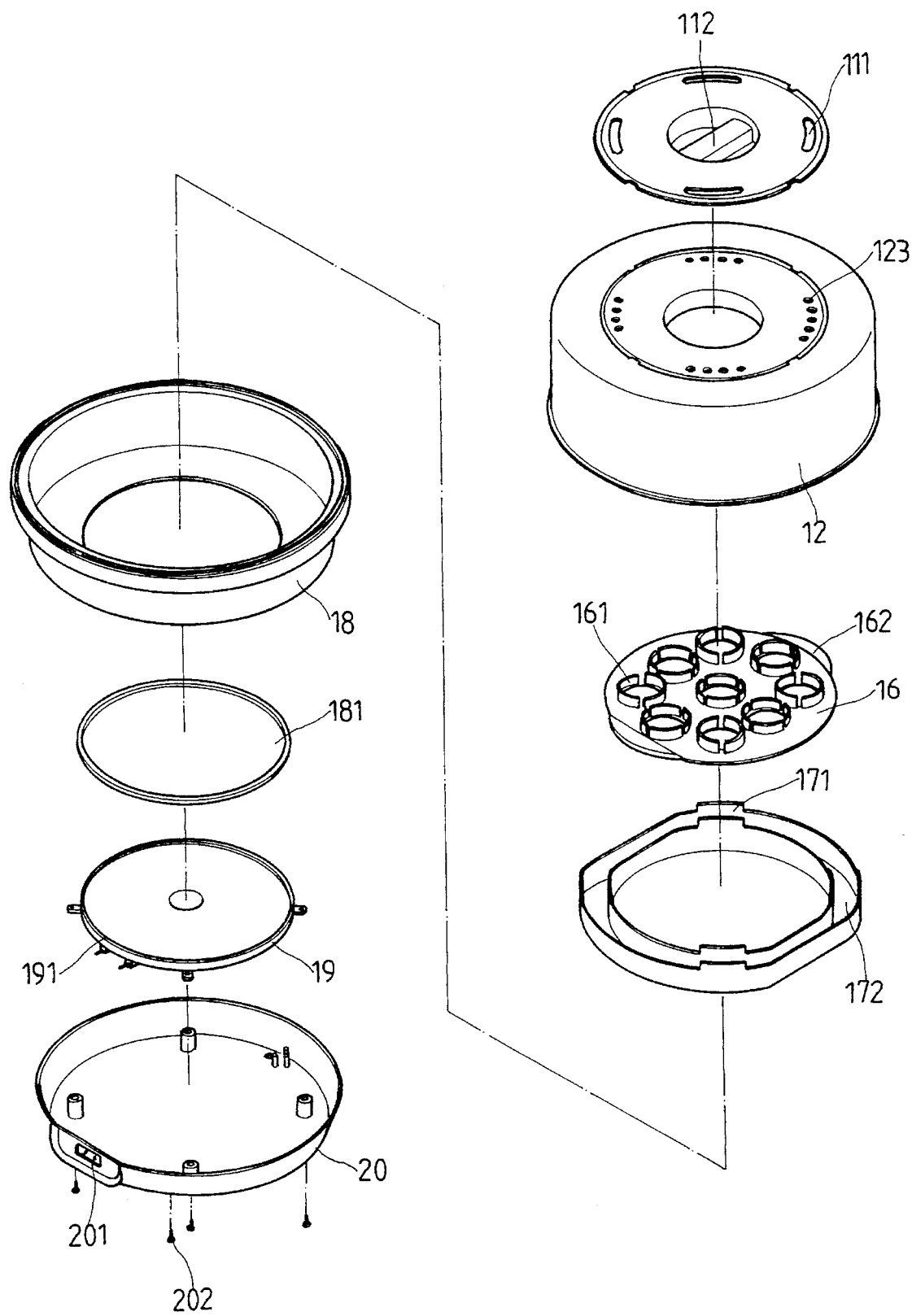
FIG. 11 is a exploded view of an egg boiler according to the present invention.
Figure 12:
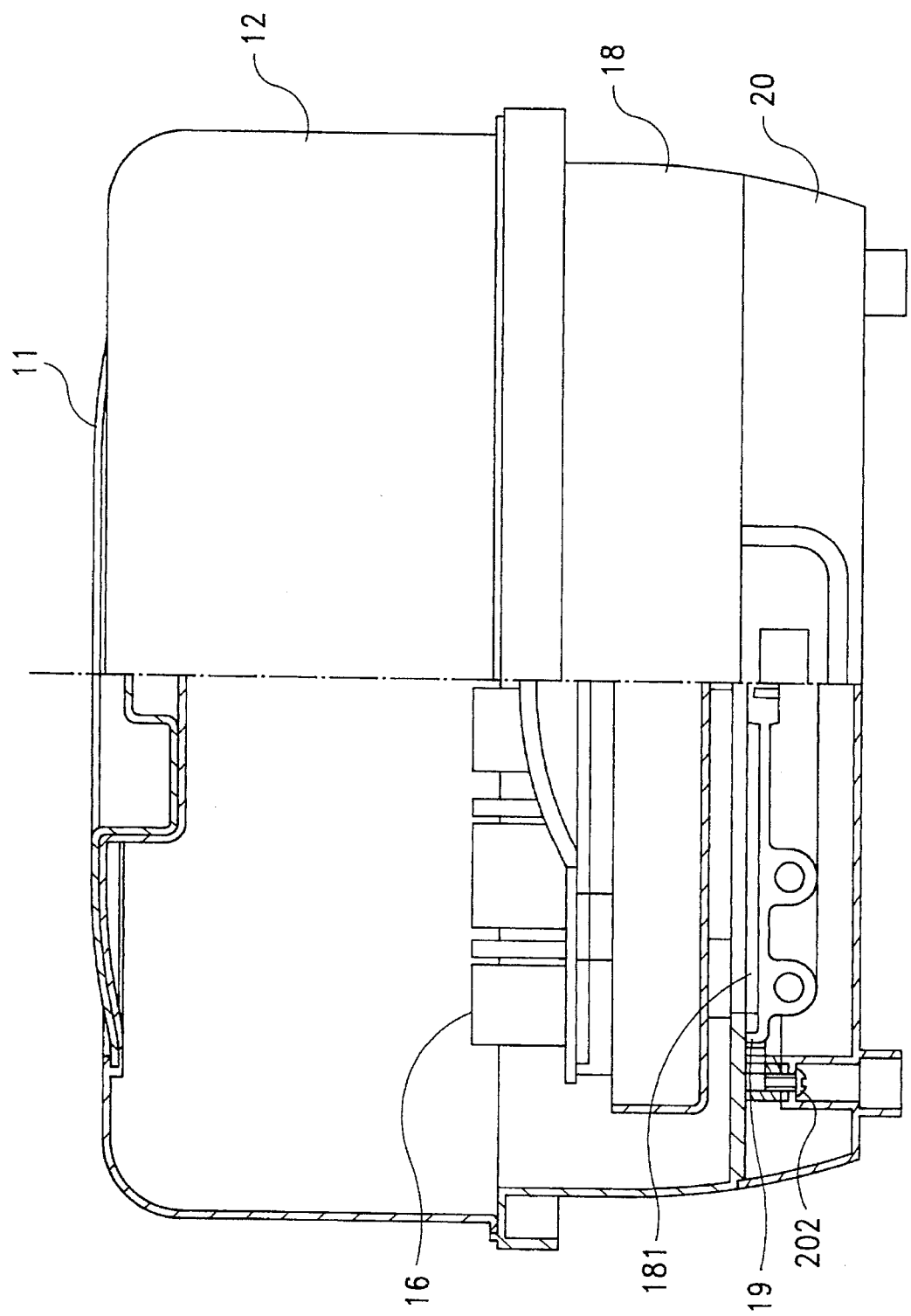
FIG. 12 is a sectional view of the egg boiler.
Figure 13:
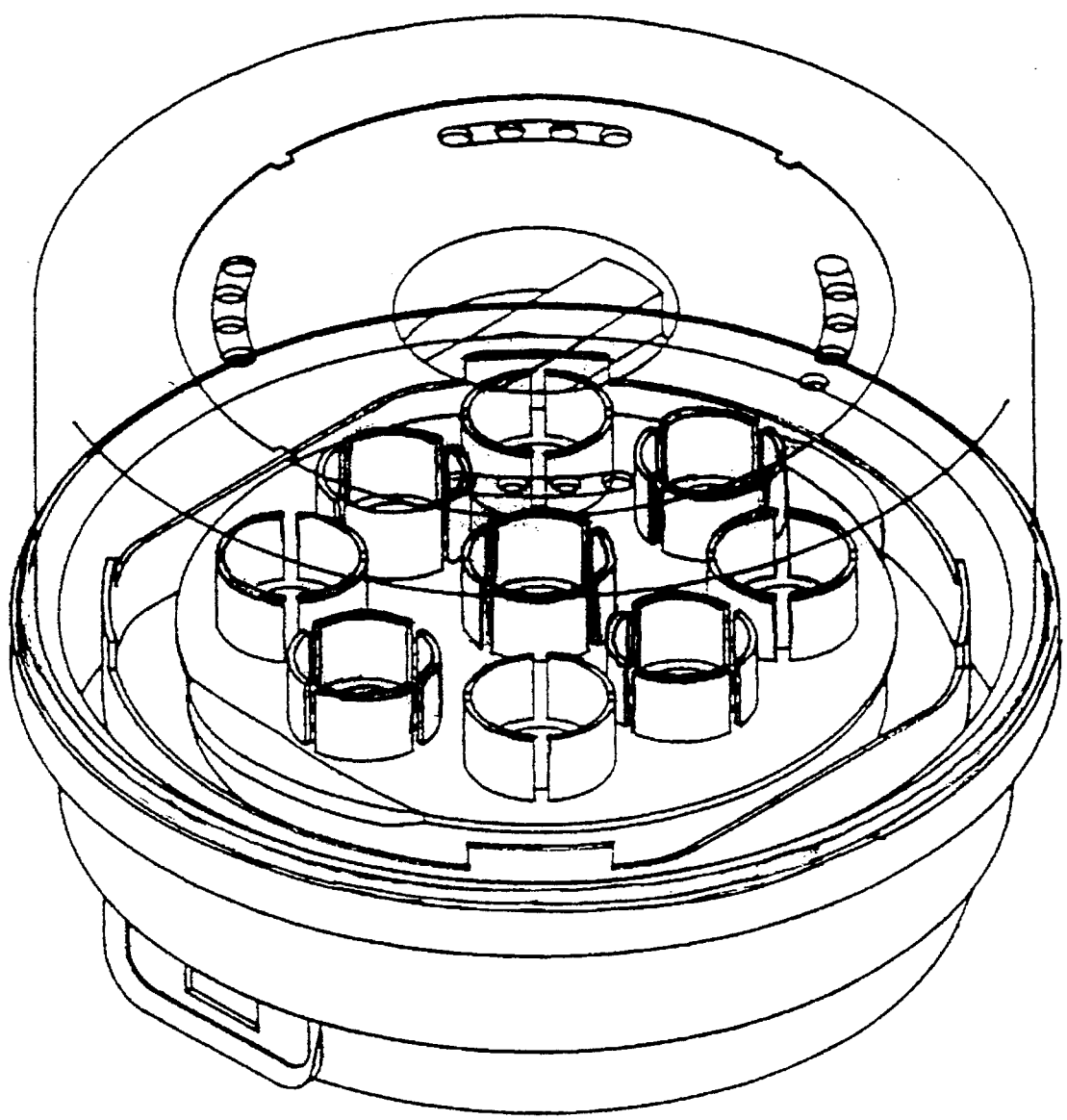
FIG. 13 is a perspective view of the egg boiler.

FIGS. 11, 12 and 13 show the way how to use the present invention to boil eggs. As illustrated, the cooking pan 13, the drying pans 14, and the steaming pan 15 are removed from the multi-purpose cooker.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A multi-purpose cooker comprising:

a base having a switch;

an electric heater mounted on said base;

a bottom plate mounted on said electric heater;

a water container mounted on said bottom plate;

a water collector mounted on said water container;

a plurality of drying pans mounted on said water container;

a steaming pan mounted on said drying pans;

a cooking pan mounted on said steaming pan;

a cover mounted on said cooking pan and formed on a top with a recess having a center hole, said recess having a plurality of ventilating perforations divided into four groups; and a lid formed with a recess adapted to be received in the center hole of said cover, a plurality of slots each being aligned with a group of the ventilating perforations, and a handle thereon.

2. The multi-purpose cooker as claimed in claim 1, wherein said cooker may be used to cook, steam, dry food and boil eggs.

* * * * *